3,511,078
PROCESS AND APPARATUS FOR THE DETERMINATION OF THE GRINDABILITY OF CEREALS
Pál Rajkai, Dunakeszi, Hungary, assignor to Labor Muszeripari Muvek, Esztergom, Hungary
Filed Nov. 24, 1967, Ser. No. 685,368
Int. Cl. G01n 3/56, 19/00, 33/10
U.S. Cl. 73—7     2 Claims

ABSTRACT OF THE DISCLOSURE

A method and apparatus for exactly determining the grinding value of wheat and other cereals, the grains are cut in three parts and these parts are crushed and ground separately. The various parts are separated by sieves some of the fractions being additionally ground and sieved. The density of the final fractions is measured and the resulting data can be utilized as an indication of the grindability of the grain.

---

The invention relates to a process for the determination of the grindability of cereals and to apparatus for the same.

The determination of the grindability of cereals, principally that of the wheat, is of utmost importance in agriculture, trade, the milling industry as well as the baking industry. At present, various investigations are carried out for the approximate determination of the grindability, the most essential of which are the determination of the weight of one hectolitre, of the hardness and of the humidity of cereals. These investigations, however, are circuitous, and mostly subjective. The grindability of cereals cannot be determined, and value may only be estimated, since the investigations relate only to the weight of one hectolitre, to the humidity and to the hardness.

The grindability can be more accurately determined by means of test mills, so-called laboratory mills. The determination of the grindability by means of test mills is carried out by flour gain. The grain samples are ground in the test mill to flour between the grinding rolls and by evaluating the humidity, ash content, water absorption and the power consumed for the grinding, a conclusion may be drawn as to the grindability.

Since with this process too, many subjective factors appear, the grindability calculated from the flour is not reliable. The accuracy is further reduced to a great extent in that in the test mills the flour gain is accomplished on scaled-down machines by a reduced grinding process, so that the grindability differs from the values of flours produced in the mills grinding several kinds of flours and having considerably larger dimensions than the test mills, and operating with a full scale process.

A further great disadvantage of the determination in this way of the grindability is that investigations resulting in the determination of the grindability are circumstantial, rendering difficult the repeated determination of the grindability, for instance several determinations from one batch.

The invention relates to the elimination of the above drawbacks and further to the determination of the grindability of cereals by a quick process eliminating the subjective and lengthy testing methods and in contrast to the methods used up to now, it relates to the determination of the weight and volume of the fractions too. It aims further at the provision of apparatus suitable for carrying out the investigations, eliminating the differences arising from the different dimensions fo the mills and—in addition to the determination of the grindability—providing, if required for the test, a flour quantity comparable to commerical practice and required for a reliable test of flours.

The invention proceeds from the known process, in which—for the purpose of the grindability determination—the grains to be tested are crushed, ground and classified in a sieve system. The invention consists in that the grains to be tested are cut before being ground on a shredding machine, and then they are separated to grain middle parts and grain end parts and so the different parts are separately crushed, ground and classified in a sieve system, and afterwards with the individual products of these operations, the grindability is numerically determined from the densities of the products obtained from each fraction. The cutting of grains to be tested by means of a grain shredding machine, before being crushed and ground, eliminates the differences arising from the various dimensions of the laboratory devices and grinding machines of mills, on the one hand, and equalizes the grains of different sizes, on the other hand, further the hull of grains is crushed in this way which means that by loosening the kernel, the work of crushing rolls is facilitated and an easy and complete separation of the kernel from the grain hull is ensured.

By dividing the grains to be tested and cut on the grain shredding machine into grain middle parts and grain end parts and by crushing, grinding and classifying the parts separately on a sieve system, thereafter determining the grindability from the density of products resulting from the fractions of the grain parts, the variation of the fine and coarse bran depending on the ratio of the hull part of the grain end-parts and grain middle-parts can be registered. In a hard wheat the ratio of the hull part of bran as end product of the same grinding process tends towards the kernel part that is to say the kernel part will be higher and the hull part lower, thereby the density becomes lower, but in a slack, wet wheat the said ratio is shifted towards the hull part, that is the hull part will be more than the kernel part, thus the density will be higher. Hence, the process according to the invention provides for a reproducible and comparable numerical value in an objective way, without requiring high skill of the operator.

The process may be carried out in such a way, that after the determination of the density the semi-finished product is cut in a chipper, sieved in a sieve system and by measuring the volume and the weight of the end product received in this way, the density and therefrom the grindability are determined.

According to the invention, the grindability may be determined from the density of either the semi-finished product or the end product. In these two latter cases, in addition to the determination of the grindability, a test flour similar to the flour obtained in the mill is ensured as an end product.

The process according to the invention is especially advantageous from the point of view of grinding technology and grinding control. The grain cleaned and prepared in the mill having been investigated by the process according to the invention, various values may be obtained as to the distribution of the cereals to be ground during processing. Consequently, the load of the various systems in the mill can accurately be determined and the grinding control can be correspondingly directed. On the basis of the values obtained by the process according to the invention, the milling controller may be informed in advance about the grinding properties of the grain and can determine in advance the optimum grinding control corresponding to the available mill equipment under the prevailing conditions.

The equipment for the determination of the grindability according to the invention has crushing-grinding roller pairs of fixed roll throat and each crushing-grinding roller pair has a sieve system. The outlets of the sieve systems according to the invention are provided with volume measuring and weighing devices. This arrangement renders possible the accurate determination of the volume and weight and so of the density, respectively, of the individual fractions.

The cutting of the grains and the formation of the suitable test quantities is ensured by the grain shredding machine arranged before the first crushing roller pair. For the evaluation of the differences between the grain middle parts and grain end parts, the grain shredding machine is provided with a device separating the grain middle parts and grain end parts, further with separate crushing-grinding roller pairs for the grain middle parts and for the grain end parts and with sieve systems pertaining to the said roller pairs.

In order to save space, the sieve systems pertaining to the grain middle parts and to the grain end parts may be superposed.

The device for determining the volume is provided as a calibrated vessel so that the volume of the grain contained therein may be easily read.

Since the volume measuring device connected to the sieve system pertaining to the first crushing-grinding roller pair is linked with the volume measuring device connected to the sieve system pertaining to the following crushing-grinding roller pair, further since the first volume measuring device has a discharge gate, the volumes of both the semi-finished products and of the end products can be determined either separately or together.

The volume measuring device arranged after the sieve system pertaining to the last crushing-grinding roller pair has a weighing scale so that the weight of the collected product can be immediately determined and the density can be calculated, respectively.

The inlet opening of the sieve system arranged after the first crushing-grinding roller pair is connected to a chipper so that the apparatus according to the invention is suitable for the production of test flour without any further sieve system.

The grain shredding machine, the crushing-grinding roller pairs, the associated sieve systems, the volume measuring and weighing devices are arranged one beneath the other. Thus, the products to move by gravity to the crushing-grinding rollers and to the volume measuring and weighing devices. In this way, the uniform feed together with the fixed, constant height as well as the uniform superposition in the volume measuring vessel are ensured.

The grindability measuring device according to the invention is provided, of course, with apparatus measuring the power consumption of the devices carrying out the shredding and crushing-grinding of the grain.

The process according to the invention will now be described in detail by way of example.

The grain, for instance wheat to be tested, is carefully cleaned from other seeds and substances, is accurately weighed and then each grain is separated into grain middle part and grain end part by means of a shredding machine. Thus, the grains of different sizes are equalized and during shredding, the kernel is loosened. In this way, the work of the crushing rollers is facilitated and the complete separation of the kernel from the hull is ensured in the shortest possible time. Now, the grain middle parts are crushed and ground on a sparsely grooved roller pair, whereas the grain end parts are crushed and ground on a closely grooved one.

The crushing and grinding being finished, the fractions are separately sieved through a sieve system, for instance a system provided with two sieves. The material remaining on the first sieves is fed separately between further crushing-grinding roller pairs, whereas the coarse groats obtained from the grain middle parts as semi-finished products of the two sieve systems, are charged in the volume measuring vessel arranged on a balance. The fine groats, coarse meal and flour of grit obtained from the grain middle parts and grain end parts are not further separated to grain end parts and grain middle parts, but are fed together to volume measuring vessels according to the different milling products and by means of the said vessels, and their volumes are determined.

The material remaining on the first sieves of the sieve system is fed between further crushing-grinding roller pairs and crushed and ground again. As with first crushing grinding roller pairs, the grain middle parts are crushed-ground between sparsely grooved roller pairs and the grain end parts between closely grooved ones. The obtained fraction is sieved in a different sieve system, and the bran remaining in the sieves of the system is fed to volume measuring vessels separately as to grain middle parts and grain end parts.

The further semi-finished products obtained from the sieve system that is the fine groats, the coarse meal and the flour of grit, are fed together (not separated as to gain end part and grain middle part) to the volume measuring vessels arranged on a balance, separately according to the milling products. Then, the volume of the semi-products in the volume measuring vessels arranged on a balance is determined and the semi-products collected from the first sieve system that is the fine groats, the coarse meal and the flour of grit, are combined with the milling products obtained from the second sieve system. Thereafter, the volume and weight of the collected semi-finished products are determined again. From the volume and weight, the weights of the coarse groats, the fine groats, the coarse meal and the flour of grit as well as of the residues can be calculated.

The process according to the invention will now be explained by way of further examples.

1000 g. of the cereals to be tested is weighed and passed through a feeder into a shredding machine, wherefrom the wheat already shredded and divided into grain middle part and grain end part passes to the grinding and sieving machines. The semi-finished products falling through the sieve are collected in volume measuring vessels arranged on a balance. The grinding of the grain to be tested being finished, the weight and volume of the products in the measuring vessels can be directly read from scales, immediately after the arresting of the balance.

Investigating for instance a wheat of quality A and of excellent grinding properties, the following values may be read as summarised results:

Coarse groats—300 g., 550 cu. cm., 540 kg./cu. m.
Fine groats—250 g., 385 cu. cm., 657 kg./cu. m.
Coarse meal—150 g., 250 cu. cm., 600 kg./cu. m.
Flour of grit—90 g., 170 cu. cm., 530 kg./cu. m.
Coarse transition—120 g., 660 cu. cm., 174 kg./cu. m.
Fine transition—70 g., 360 cu. cm., 194 kg./cu. m.

When testing a wheat of quality C and of low grinding properties, the following values are obtained as summarised results:

Coarse groats—50 g., 110 cu. cm., 454 kg./cu. m.
Fine groats—150 g., 270 cu. cm., 555 kg./cu. m.
Coarse meal—250 g., 450 cu. cm., 555 kg./cu. m.
Flour of grit—200 g., 370 cu. cm., 540 kg./cu. m.
Coarse transition—200 g., 740 cu. cm., 270 kg./cu. m.
Fine transition—140 g., 460 cu. cm., 300 kg./cu. m.

From these data, the grindability of cereals may definitely be determined because the volume and weight, as well as the density of the semi-finished product obtained from each fraction give reliable data which provide for a clear picture of the grinding properties of cereals. The grinding properties of cereals depend namely on the structure of the grains which means that with the hard and dry grain, the fractions tend towards the kernel that is the proportion of the kernel will be higher than that of the hull, so that with the kernels the density will be higher, but in the hull parts (transition), lower, whereas in the soft, wet grains the relationship is inverse, the proportion of the hull part (transition) will be higher and that of the kernel lower, consequently the density will correspondingly vary.

In the above examples the measurement results of two wheats of extreme qualities and grinding properties are tabulated, which support numerically the statements relating to the grinding properties of the wheats.

Taking into account the statements of those theoretically and practically skilled in the art as well as of the literature, according to which the quality of hard wheats having a high groat-yield is always better than that of the soft wheats of low groat-yield, not only the grinding properties but also the quality can be simultaneously determined when measuring. Since a close connection exists between the grinding properties and the quality (food value, protein content), the equipment and the process according to the invention are suitable at the same time for the measurement of the quality too.

When selling cereals it is of great importance that the determination of properties characterizing the quality of cereals should be carried out as quickly as possible and with the least possible investigations. By the use of the process and equipment, the testing of a wheat sample of 1000 g. may be carried out in 3 to 5 minutes, whereas the conventional qualifying methods require numerous, lengthy measurements and qualitative and quantitative tests (food value, protein content), and from the obtained results only an estimate can be made of the quality of cereals. At present, the grain terminals have no equipment suitable for the above investigations, since they are not only expensive but the determinations are time consuming (with a duration of several hours), so that the qualification and quick sale of large amounts of cereals is not possible.

By means of the equipment and process according to the invention an operator without any special skill can classify the different wheats into various quality grades on the basis of the values measured on the equipment. The cereals for which the percentage yield of the coarse fraction is the highest and the percentage yield of the residues is the lowest (containing the most hull parts), are classified into the group A of excellent grindability, and those for which the percentage yield of the coarse fractions is the lowest and the percentage yield of the residues is the highest, are classified into the wheat category C of low grindability, whereas the wheats of medium percentage yield are included in the wheat category B of medium grindability.

In addition to the percentage yield of the individual fractions the density plays also a considerable role, since in the semi-finished products the higher density characterizes the hull-content of the products that is the higher the density, the lower the hull-content as compared to the kernel content. As it is to be seen in the tables, in the residues, the products of lower volume contain more hull part and less kernel part.

The three quality classes of "A" excellent, "B" good and "C" poor grindability, can be further divided into subgroups as required by the beneficiation of the respective qualities and as rendered possible by the available storage space. It is of utmost importance for the processing industry to have the cereals of various quality stored separately. This is provided for by the classification ensured by the equipment and the process.

The cereals stored separately according to the various qualities offer considerable advantages for the processing industry since the mills can be utilized at maximum and flour of uniformly good quality can be ensured for the baking industry.

If test flour necessary for the quality tests is also required, the fractional products—with the exception of the bran—are mixed and further cut in the chipper and fed again through the sieve system. In this way, test flour can simultaneously be obtained.

A great advantage of the process according to the invention is the control possibility since the sum of weights of the individual fractional products must be the same as the weight of the fed-in grains to be tested.

The equipment for determining the grindability according to the invention will now be described in detail by way of example with reference to the drawing, which is a schematic representation of the equipment for determining the grindability according to the invention.

Figures 1, 2:
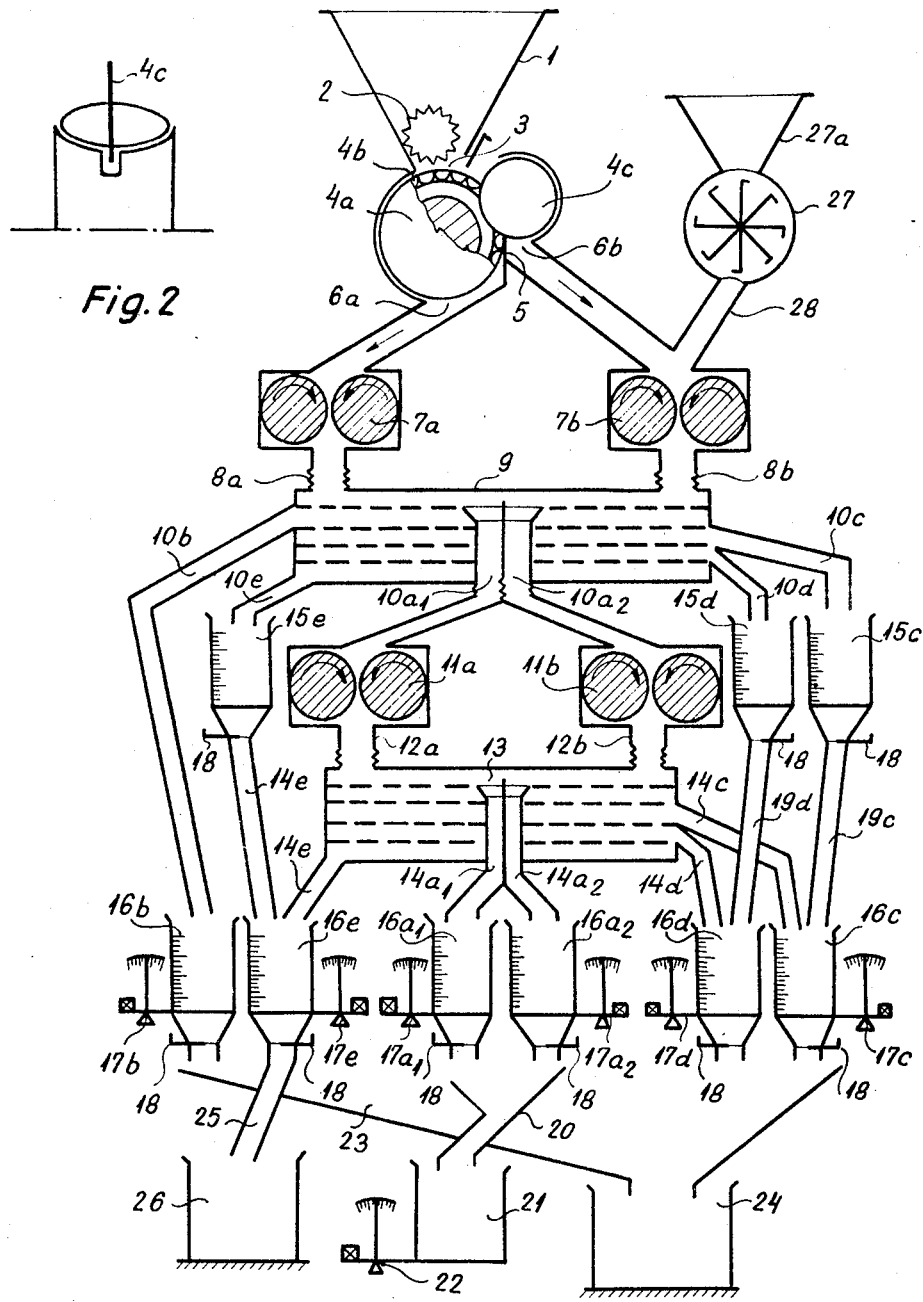
FIG. 1 is a schematic diagram of the apparatus of the invention.
FIG. 2 shows a part of FIG. 1 in greater detail.

In the embodiment shown in the drawing, feeding means 2 are arranged on the discharge end of a feeding hopper 1. Beneath the feeding means 2 is a throat 3 to which the grain shredding machine 4 is connected. The grain shredding machine 4 consists of a saddle disc 4a and of knives 4b. Beneath the grain shredding machine 4 a separating plate 5 is arranged. Beneath the shredding knives 4b a hopper 6a collecting the grain middle is situated, whereas beneath the saddle disc 4a a hopper 6b collecting the grain end parts are situated. The hopper 6a feeds the inlet opening of a crushing-grinding roller pair 7a of fixed roll throat and the hopper 6b feeds a crushing-grinding roller pair 7b similarly of fixed roll throat. The crushing-grinding roller pair 7a is sparsely grooved, whereas the crushing-grinding roller pair 7b is more closely grooved. The discharge openings of both the crushing-grinding roller pair 7a and of that 7b are connected to the inlet opening of the sieve system 9 by flexible pipes 8a and 8b. In the embodiment, the sieve system 9 is a single-box, double-part, two-sieve system.

For the removal of the residues on the first sieves of the sieve system for deflecting pipes $10a_1$ and $10a_2$ are provided which are connected to the inlet openings of the crushing-grinding roller pairs 11a and 11b, respectively, by flexible pipes.

The sieve system is provided with a pipe 10b for discharging the coarse groats, with a pipe 10c for discharging the fine groats, with a pipe 10d for discharging the coarse meal and with a pipe 10e for discharging the flour of grit. The pipe 10b discharging the coarse groats leads to a volume measuring vessel 16b arranged on a balance 17b. The pipe 10c discharging the fine groats is connected to a volume measuring vessel 15c, the pipe 10d discharging the coarse meal to the volume measuring vessel 15d, whereas the pipe 10e discharges the flour of grit to the volume measuring vessel 15e.

Each volume measuring vessel is calibrated and is made of transparent material and is provided with an outlet valve 18 at its lower part.

The crushing-grinding roller pairs 11a and 11b are provided with fixed inlet openings. The grooving of the roller pair 11a grinding the residues received from the grain middle parts is sparser than that of the crushing-grinding roller pair 11b crushing the residues from the grain end parts, this latter being of closer grooving. The discharge openings of the crushing-grinding roller pairs 11a and 11b are connected through flexible pipes 12a and 12b to the inlet openings of the sieve system 13. In the embodiment shown, the sieve system 13 is of single-box, double-part type, having two sieves.

For the discharge of residues remaining on the first sieves of the sieve system 13, there are outlet conduits $14a_1$ and $14a_2$ leading into the volume measuring vessels $16a_1$ and $16a_2$ arranged on balances $17a_1$ and $17a_2$.

For the discharge of the semi-finished products obtained when sieving, the sieve system 13 is provided with a pipe 14c for discharging the fine groats, with a pipe 14d for discharging the coarse meal and with a pipe 14e for discharging the flour of grit. The conduit 14c discharging the fine groats is connected to the volume measuring vesse 16c arranged on a balance 17c, the conduit 14d discharging the coarse meal to the volume measuring vessel 16d arranged on the balance 17d, whereas the conduit 14e discharges the flour of grit to the volume measuring vessel 16e on a balance 17e.

The volume measuring vessel 15c is connected to the volume measuring vessel 16c by means of a valve 18. In the same way, the volume measuring vessel 15d is coupled with the volume measuring vessel 16d by means of a pipe 19d, and the volume measuring vessel 15e to the volume measuring vessel 16e through a pipe 19e.

Beneath the volume measuring vessels $16a_1$ and $16a_2$ a collecting hopper 20 is arranged just below the valve 18, which forwards the content of both volume measuring vessels into a volume measuring vessel 21 arranged on the balance 22.

Beneath the volume measuring vessels 16b, 16c and 16d, a collecting hopper 23 is located for directing the content of the volume measuring vessels into a receiver 24. Under the volume measuring vessel 16e a pipe 25 is arranged leading to the receiver 26.

The equipment for determining the grindability according to the invention may be provided with a chipper 27— in the embodiment shown with a sledge mill—connected to the inlet opening of the crushing-grinding roller pair 7b by means of a pipe 28. The chipper 27 has an inlet hopper 27a.

The grain shredding machine, the crushing-grinding roller pairs, the chipper and the sieve system are driven by a common driving engine not shown in the drawing. The equipment for determining the grindability according to the invention may be provided also with a power measuring instrument, indicating the energy consumed during the operation of the grain shredding machine, the crushing-grinding roller pairs, and the chipper.

When determining the grindabilty of cereals, the grains to be tested are relieved of foreign substances and initially measured, and then the grains are fed to the feeding hopper 1 of the equipment for determining the grindability according to the invention. The grains are fed kernel by kernel by the feeding means 2 into the throat 3. The grain falling through the throat 3, lodges in the saddle discs 4a of the grain shredding machine, where the grains are cut by the knives 4b into grain end parts and grain middle parts. The grain end parts fall into the hopper 6b collecting them and situated beneath the saddle disc 4a, whereas the grain middle parts being between the knives 4c fall into the collecting hopper 6a for the grain middle parts.

The grain middle parts travel from the hopper 6a through the crushing-grinding roller pair 7a and the grain end parts from the hopper 6b, through the crushing-grinding roller pair 7b. After the crushing-grinding operation, the grain middle parts flow through the pipe 8a and the grain end parts through the pipe 8b into the single-box, double-part sieve system 9.

The residues on the first sieves of the sieve system 9— that is the residue of the grain middle parts and grain end parts—move through the crushing-grinding roller pairs 11a and 11b, through the dicharge conduits $10a_1$ and $10a_2$. From the other products of the sieve system 9, the coarse groats flow through the conduit 10b into the volume measuring vessel 16b arranged on the balance 17b, the fine groats through the discharge conduit 10c of the sieve system 9 into the volume measuring vessel 15c, the coarse meals move through the discharge conduit 10d into the volume measuring vessel 15d, whereas the flour of grit is fed through the discharge conduit 10e into the volume measuring vessel 15e. In such a case, the valves 18 of the volume measuring vessels are in closed position.

The products obtained after crushing and grinding from the crushing-grinding roller pairs 11a and 11b move through the pipes 12a and 12b into the single-box, double-part sieve system 13 consisting of two sieves. The residues on the first sieves of the sieve system 13 that is to say the bran of the grain middle parts and grain end parts, flow through the conduits $14a_1$ and $14a_2$ into the volume measuring vessels $16a_1$ and $16a_2$ arranged on the balances $17a_1$ and $17a_2$. The fine groats move from the sieve system 13 into the volume measuring vessel 16c arranged on the balance 17c. The coarse meal is fed through the discharge conduit 14d into the volume measuring vessel 16d arranged on the balance 17d, whereas the flour of grit is fed through the discharge conduit 14e into the volume measuring vessel 16e on the balance 17e.

Now, the volume of the received fine groats, coarse meal and flour of grit may be read on the volume measuring vessels 15c, 15d and 15e. Thereafter, the volume of the bran obtained from the grain middle parts and grain end parts and collected in the volume measuring vessels $16_1$, $16a_2$, 16b, 16c, 16d and 16e, further that of the fine groats, coarse meal and flour of grit received from the second crushing-grinding operation are read.

The valves 18 of the volume measuring vessels 15c, 15d and 15e are now opened, whereupon the products collected therein fall through the conduits 19c, 19d and 14e into the volume measuring vessels 16c, 16d and 16e, according to the different fractions.

Subsequently, the volumes of the products collected in the volume measuring vessels 16c, 16d and 16e are read again and then the weights of the semi-finished products collected in the measuring vessels are determined by means of the balances $17a_1$, $17a_2$ 17b, 17c, 17d and 17e supporting the measuring vessels.

From the data obtained in this way, the densities of the semi-finished products are calculated which then together determine the grindability of the grain. The determination of the grindability may be checked, since the total weight of the semi-finished products must be the same as the weight of the grains previously weighed and fed to the hopper 1.

Since the fractions fall gravitationally into the volume measuring vessels, the superposition of the semi-finished products remains in any case the same due to the same height.

At the end of the investigation the valves 18 of the volume measuring vessels $16a_1$ and $16a_2$ are opened and the bran thus flows into the volume measuring vessel 21. In the volume measuring vessel 21 the total volume of the bran is read and the weight thereof is determined on the balance 22. The two data render possible the calculation of the density of the bran. From the volume measuring vessel 16e, the flour of grit—the density of which has been previously calculated—is fed into the volume measuring vessel 26 by opening the valve 18.

If the flour of grit is also needed, the valves 18 of the volume measuring vessels 16b, 16c, and 16d are opened and the coarse groats, the fine groats and the coarse meal are collected in the receiver 24 and then fed to the hopper 27a of the chipper 27. The product fed through the hopper 27a is crushed in the chipper 27, then fed through the crushing-grinding roller pair 7b and sieved in the sieve system 9. Now, repeating the other operations, different kinds of flour may be received in the volume measuring vessels 15 and 16. By measuring—as described above—the volume and weight of each semi-finished product and end product of flour, the densities of the end products as well as the grindability of the products obtained therefrom may be calculated even with the flour of grit.

The power consumption of the crushing and grinding with the equipment according to the invention may be read from the power measuring instrument. This value gives an indication to the amount of power required for the grinding of grains.

What I claim is:

1. A process for determining the grindability of cereals, comprising the steps of cutting the grains of the cereal into middle parts and end parts, collecting the middle parts and the end parts separately from one another, processing the middle parts by crushing, grinding and sieving and determining their grindability by means of weighing, and processing the end parts separated from the said middle parts in the same manner.

2. Apparatus for determining the grindability of cereals, comprising:
- a hopper for receiving the cereal grains;
- a cutting apparatus underneath the hopper containing a disc having recesses for the individual grains, disc-shaped knives penetrating into circular grooves of the said disc for cutting the grains into middle parts and end parts;
- a grain-feeding apparatus between the said hopper and the said cutting apparatus;
- means for separating the grain middle parts from the end parts and for separately collecting the end parts and the middle parts;
- crushing, grinding and sieving means for the middle parts and similar independent means for processing the end parts; and
- measuring devices for determining the volume weight of the product produced from the middle parts independently from the end parts, and for determining the volume weight of the product prepared from the end parts independently from the middle parts.

References Cited

UNITED STATES PATENTS

| | | | |
|---|---|---|---|
| 1,117,963 | 11/1914 | Pollock | 241—9 |
| 1,258,076 | 3/1918 | Woolner | 241—9 XR |
| 1,553,478 | 9/1925 | Smith | 73—7 XR |
| 1,670,812 | 5/1928 | Kipp | 146—71.5 |
| 1,744,169 | 1/1930 | Kipp | 146—71.5 |
| 2,016,779 | 10/1935 | Hardgrove | 73—7 |
| 2,377,741 | 6/1945 | Andrews et al. | 241—9 XR |
| 2,537,717 | 1/1951 | Tourneur et al. | 146—71.5 XR |
| 3,362,649 | 1/1968 | Odden | 241—9 XR |

S. CLEMENT SWISHER, Primary Examiner

U.S. Cl. X.R.

73—432